Dec. 28, 1937.   J. W. LEIGHTON   2,103,729
SPRING OR SHACKLE MOUNTING
Filed May 18, 1935
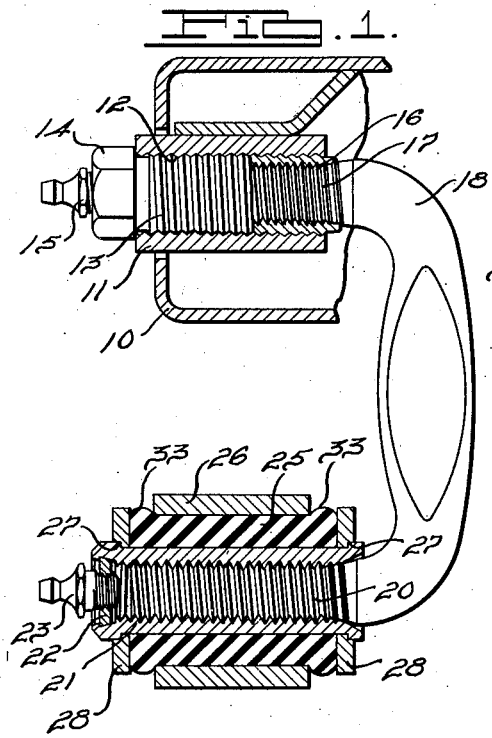
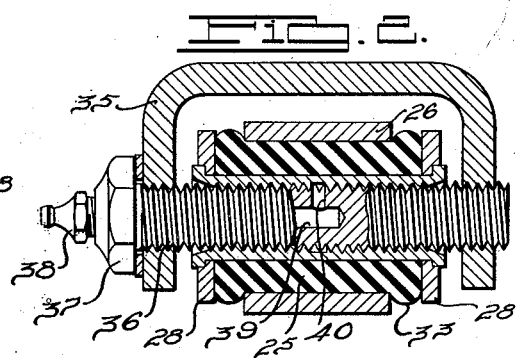
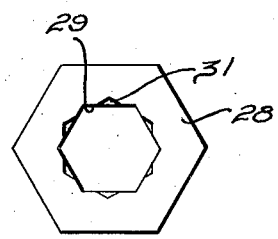
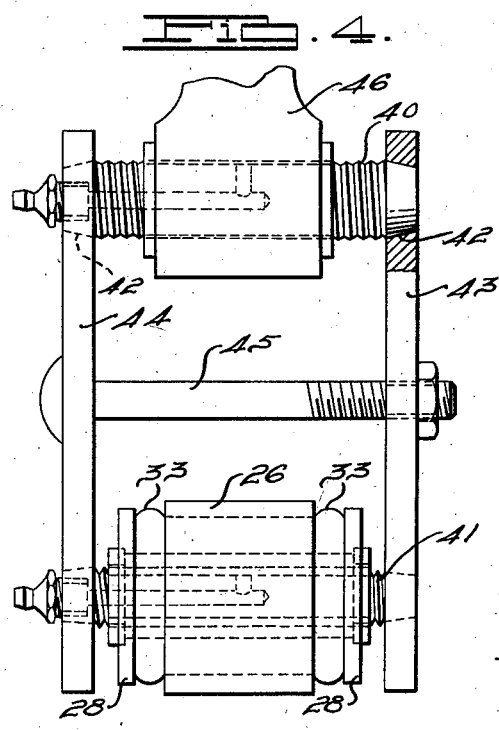
INVENTOR.
John W. Leighton.
BY
Harness, Dickey, Pierce & Hann.
ATTORNEYS.

Patented Dec. 28, 1937

2,103,729

UNITED STATES PATENT OFFICE 2,103,729

SPRING OR SHACKLE MOUNTING

John W. Leighton, Port Huron, Mich.

Application May 18, 1935, Serial No. 22,229

4 Claims. (Cl. 287—85)

The invention relates generally to oscillatory joints for automobiles and it has particular relation to an oscillatory joint in a spring or shackle mounting.

One object of the invention is to provide an improved oscillatory joint having an interposed rubber bushing, which is of inexpensive although durable construction and wherein the parts may be readily assembled.

Another object of the invention is to provide an improved oscillatory joint having an interposed rubber bushing, wherein improved means are employed for holding the rubber bushing under compression.

Another object of the invention is to provide an improved oscillatory joint including a metal to metal oscillatory connection and a secondary oscillatory connection including a rubber bushing, wherein the bushing has little torque resistance at the beginning of any pivotal movement and thereafter during continuation of the movement, has a gradually increasing torque resistance until it overcomes the static resistance of the metal connection and causes the latter to serve as the major pivotal connection, so as to avoid a condition where the static resistance of the metal connection must be overcome before any pivotal movement can occur.

Another object of the invention is to provide an improved oscillatory joint having a rubber bushing and a metal to metal oscillatory connection, wherein the latter comprises relatively oscillatory parts having a threaded, pivotal relation.

Other objects of the invention will become apparent from the following specification, the drawing relating thereto and from the claims hereinafter set forth.

For a better understanding of the invention reference may be had to the drawing, wherein:

Figure 1 is a vertical, cross-sectional view illustrating a shackle connection constructed according to one form of the invention.

Fig. 2 is a similar cross-sectional view illustrating an oscillatory connection constructed according to the invention, between the frame of the vehicle and the spring at the end of the latter opposite the shackle connection.

Fig. 3 is a detail view of the element provided for holding the rubber bushing in place and under compression.

Fig. 4 is an elevational view of a different form of shackle arrangement which embodies certain principles of the invention.

Referring to Fig. 1, an automobile chassis frame is indicated at 10 and a metal bushing rigidly fastened to the frame, such as by welding, is indicated at 11. This bushing has internal threads 12 which are of shallow depth and of self-locking character and a second bushing 13 having similar threads is threaded thereinto and has a hexagonal end 14 provided mainly for turning the bushing. A grease fitting 15 or the like extends through the head 14 for the purpose of injecting lubricant to the interior of the bushing 13. The interior of the bushing 13 is provided with standard internal threads 16 having however the same pitch as the threads on the outer surface of the bushing and the internal threads are adapted to receive a threaded end 17 of a U-shape shackle bolt 18. It will be appreciated that with the bushing 13 removed, the threaded end 17 of the shackle bolt 18 may be loosely inserted in the bushing 11 until approximately in proper position, and that then the bushing 13 may be threaded into the bushing 11 and simultaneously on the end of the shackle bolt. The threaded engagement between the shackle bolt and the bushing 13 normally permits a free pivotal movement and, as stated previously, the threaded connection between the bushing 13 and the bushing 11 is of self-locking character so as to normally prevent any relative turning between the bushings.

The opposite end of the shackle bolt 18 has an end 20 provided with standard threads and is threaded into an interiorly threaded bushing 21 having a smooth, cylindrical outer surface. A welch plug 22 closes the outer end of the bushing 21 and a grease fitting 23 may be provided in the plug for lubricating the threaded connection accordingly provided. It will be appreciated that the use of standard threads in this connection will normally permit a free, pivotal movement of the shackle bolt with respect to the bushing 21. A rubber bushing 25 extends around the bushing 21 and is received within an eye 26 formed at the end of a conventional leaf spring on the automobile. The metal bushing has hexagonal heads 27 at the ends and the perpendicular distance between the oppositely disposed flat sides of the head substantially is the same as the outer diameter of the cylindrical portion between the heads. Washers or collars 28 are provided on the metal bushing at each end of the rubber bushing and, as shown best by Fig. 3, each of these washers has a hexagonal opening 29 and the size of this opening is such that the head 27 may pass through the opening when the corner portions of the head are aligned with the corner portions of the opening.

Now as also shown by Fig. 3, a hexagonally disposed, corner-shaped recess 31 is formed in the outer portion of each of the collars so that the recesses substantially are mid-way between the corner portions of the opening 29 extending entirely through the collars. It should now be appreciated that the head 27 on the bushing 21 may be inserted through the collar by aligning its corner portions with the corner portions of the opening 29 in the collar and then upon turning the collar into alignment with the recess corner portions 31. Then upon moving the collar so as to cause the corner portions on the head 27 to move into the recesses 31, the head will be locked against turning with respect to the collar.

In assemblying this arrangement, the bushing 21 is threaded on the end of the shackle bolt and then the inner collar is slipped over the outer head on the bushing and moved axially over the bushing until it is locked to the inner head on the bushing in the manner previously stated. Then the rubber bushing is applied over the bushing 21 between it and the eye of spring until the parts are approximately centered. Then the outer collar is slipped over the outer head 27 on the bushing and by applying axial pressure to this collar, the rubber bushing may be compressed axially until its ends bulge out as indicated at 33. Then the collar on the outer end of the metal bushing may be turned 30 degrees following which it is released and the recesses 31 in the collar receive the corner portions on the outer head 27. The position of the collars is maintained by the compressed rubber as it naturally exerts a force tending to move the collars farther apart and once the collars are locked to the heads so as to prevent relative turning, it will be appreciated that neither collar can move inwardly sufficiently to allow the corner portions on the head 27 to slip out of the recesses 31.

Axial compression of the rubber bushing serves to bind the surfaces thereof to the eye and metal bushing so that any relative turning of the latter and the eye causes a similar movement between the inner and outer portions of the rubber bushing which sets up a torque resistance in the rubber that increases according to the degree of turning. Also, this compression of the bushing serves to hold the parts of the connection in the desired, relative axial positions and particularly the shoulders 33 between the collars and spring eye serve definitely for this purpose.

The eye at the opposite end of the spring may be connected to the chassis frame by means of a U-shaped bracket 35 that may be welded or otherwise secured to the frame. The legs of this bracket have a threaded pin 36 extending therethrough and the outer end of this stem may have a head 37 for turning it and a grease connection 38 as previously mentioned. The eye portion of the spring is mounted on this pin by means of a rubber bushing, a metal bushing and locking collars, in the same manner as described in connection with the lower end of U-shaped shackle bolts shown by Fig. 1. It may be noted that the pin 36 has an interior bore 39 and a radial opening 40 by means of which lubricant may be injected between the threads.

In a construction such as described, the rubber bushing provides a cushioning as well as sound deadening means in the joint and this not only promotes comfort in the riding qualities of the vehicle but also promotes quietness during spring and vehicle body movement. While the threaded pivotal connection between the pin or shackle bolt and metal bushing normally will operate freely, there normally is static frictional resistance to the starting of relative movement between the threads, particularly on account of the vehicle load. This static frictional resistance between threads naturally resists the starting of any pivotal movement and naturally acts against the springing action. The rubber bushings, however, have little initial torque resistance and will readily permit the metal bushing and pin or shackle end to turn initially together, thus rendering it unnecessary to overcome a large static frictional resistance between threads at the beginning of pivotal movement. As the metal bushing continues to turn, however, the torque resistance of the rubber increases and finally is sufficient to overcome the static frictional resistance between threads in the metal connection. Normally, of course, the threaded pivotal connection will take care of substantially all oscillatory movement but the rubber bushing provides means for allowing pivotal movement to begin at substantially zero resistance and then for causing this resistance to build up during continuation of pivotal movement owing to the torque resistance of the rubber increasing until the torque resistance of the rubber overcomes the frictional resistance between threads, when the metal pivotal connection will freely act to take care of oscillatory movement. From another angle it will be appreciated that the threaded pivotal connection prevents an undesirably high torque strain on the rubber. Both factors in combination provide a relatively free joint movement that effects desirably uniform results.

It will be appreciated also that side swaying of the chassis frame and body with respect to the springs is practically prevented and the little movement that can occur, is resilient. In other words, a sudden thrust of the chassis frame sidewise can only result in a little side sway of the chassis frame with respect to the spring and this movement is cushioned and furthermore the rubber increasingly resists this relative movement. It may be pointed out also that desirable sidewise tilting of the chassis frame may occur to a small extent owing to the deformability of the rubber but this is likewise cushioned and is resisted in an increasing manner.

In the construction shown by Fig. 4, the shackle comprises threaded pins 40 and 41 having tapered ends 42 received in corresponding sockets in spaced members 43 and 44 held together by means of a bolt 45. The shackle is suspended from the frame by means of a member 46 which may be connected to the pin 40 in substantially the same way as the threaded end 17 of the U-shaped shackle shown in Fig. 1 is connected to the chassis frame. Similarly the bolt 41 at the lower end of the shackle may be connected to the eye portion of the spring indicated at 26, in the same manner as the lower end of the U-shaped shackle in Fig. 1 is connected to the spring eye.

The same type of joint as employed at the lower ends of the two shackles shown in Figs. 1 and 4 may also be employed at the upper ends of the shackles if this is found desirable, but it is probably not as important in the upper end of the shackle because the static frictional resistance between the threads is overcome more easily owing to the leverage of the shackle between the spring eye and upper connection.

While more than one form of the invention has been illustrated and described in detail, it will be apparent to those skilled in the art that various modifications may be made without departing from the scope of the appended claims.

I claim:

1. A joint comprising a member having a polygonal, outwardly directed flange portion on one end, a second member having an aperture receiving the first member, a resilient bushing between the members, means on the other end of the first member for engaging the end of the bushing, means including a collar having a polygonal opening through which the polygonal flange portion may axially pass when the corners of the flange and opening are axially aligned for engaging the other end of the bushing, and inwardly offset corner recesses on the outer side of the collar and spaced circumferentially from the corners of the opening for receiving the corners of the flange portion on the first member when the collar after being axially moved over and past the flange, is turned and is moved in the opposite axial direction.

2. A joint comprising an elongated member, a rubber bushing around the member, an apertured member receiving the bushing and having its aperture of such axial length that the ends of the bushing project beyond the ends of the aperture, means on one end of the first member adapted to engage one end of the bushing, an outwardly directed projection on the other end of the first member, and a collar having an opening adapting it to pass over the latter end of the first member and the projection, said collar having a shouldered recess in its outer side for receiving the projection and locking the collar against turning and rendering it necessary to move the collar inwardly and to further compress the rubber bushing before the collar can be turned to a position where it can be removed axially over the projection.

3. In combination, a tubular bushing having integral, outwardly directed, hexagonal flanges or collars at its ends respectively, a member pivotally arranged within the tubular member, a resilient bushing surrounding the tubular member between the flanges or collars, an eye member surrounding the resilient bushing, and collars between the ends of the resilient bushing and the collars on the first bushing for holding the bushing in position, said second collars having hexagonal openings adapting them to be slipped endwise over the first collars and also having shallow recesses in their outer faces for receiving the corner portions of the first collars when the second collars are slipped inwardly past the first collars and then turned and moved reversely towards the first collars.

4. A joint comprising an elongated member, resilient means around the member, means on one end of the member engaging the resilient means, an outwardly directed projection on the other end of the member, and a collar having an opening adapting it to pass over the latter end of the member, said collar having a shouldered recess in its outer side for receiving the projection and for locking the collar against turning and rendering it necessary to move the collar inwardly and to compress the resilient means before the collar can be turned to a position where it can be removed axially over the projection.

JOHN W. LEIGHTON.